United States Patent [19]
Dowling

[11] Patent Number: 6,163,836
[45] Date of Patent: Dec. 19, 2000

[54] PROCESSOR WITH PROGRAMMABLE ADDRESSING MODES

[75] Inventor: Eric M. Dowling, Richardson, Tex.

[73] Assignee: Micron Technology, Inc., Boise, Id.

[21] Appl. No.: 09/022,285

[22] Filed: Feb. 11, 1998

Related U.S. Application Data

[60] Provisional application No. 60/054,471, Aug. 1, 1997.

[51] Int. Cl.[7] .................................................. G06F 15/00
[52] U.S. Cl. ................................ 712/37; 712/32; 712/42; 712/209
[58] Field of Search .................................. 712/32, 37, 36, 712/38, 42, 209, 227

[56] References Cited

U.S. PATENT DOCUMENTS

| | | |
|---|---|---|
| 3,959,774 | 5/1976 | Mead . |
| 4,476,522 | 10/1984 | Bushaw et al. . |
| 4,694,419 | 9/1987 | Okamoto et al. . |
| 4,713,749 | 12/1987 | Magar et al. ............................ 712/241 |
| 4,782,443 | 11/1988 | Matsumoto . |
| 4,887,203 | 12/1989 | MacGregor et al. . |
| 4,920,482 | 4/1990 | Hasebe et al. . |
| 5,043,879 | 8/1991 | Concha et al. . |
| 5,086,407 | 2/1992 | McGarity et al. . |
| 5,123,096 | 6/1992 | Matuo . |
| 5,175,863 | 12/1992 | Jones, Jr. ................................... 712/36 |
| 5,404,471 | 4/1995 | Kawano et al. . |
| 5,539,892 | 7/1996 | Reininger et al. . |
| 5,555,424 | 9/1996 | Sederlund et al. . |
| 5,923,893 | 7/1999 | Moyer et al. .............................. 712/38 |

*Primary Examiner*—John A. Follansbee
*Assistant Examiner*—Mackly Monestime
*Attorney, Agent, or Firm*—Gazdzinski & Associates

[57] ABSTRACT

A programmable address arithmetic unit and method for use on microprocessors, microcontrollers, and digital signal processors is described. The addressing arithmetic unit incorporates a programmable logic array or other programmable device coupled to address registers and the instruction stream, the address unit being responsive to commands in the processor's instruction set. A first set of instructions control the initialization and configuration of the address arithmetic unit logic. A second set of instructions reference operands using one or more addressing modes that calculate the operand's effective address using the logic programmed by said first set of instructions.

33 Claims, 10 Drawing Sheets

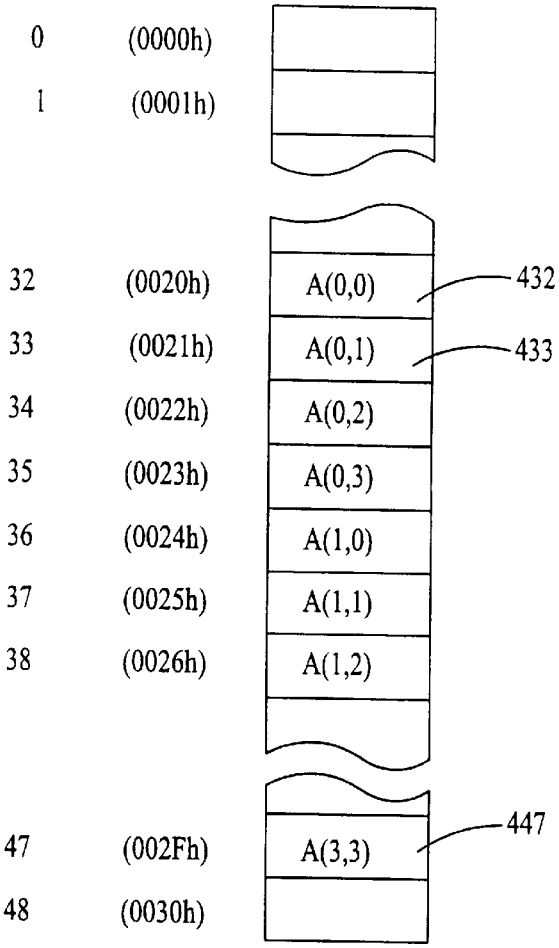
FIG. 4A
FIG. 4B
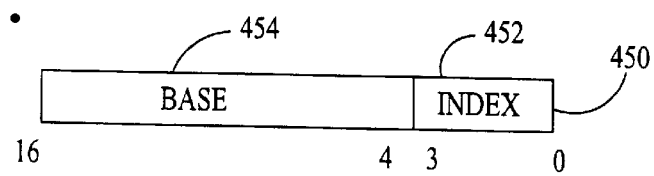
FIG. 4C

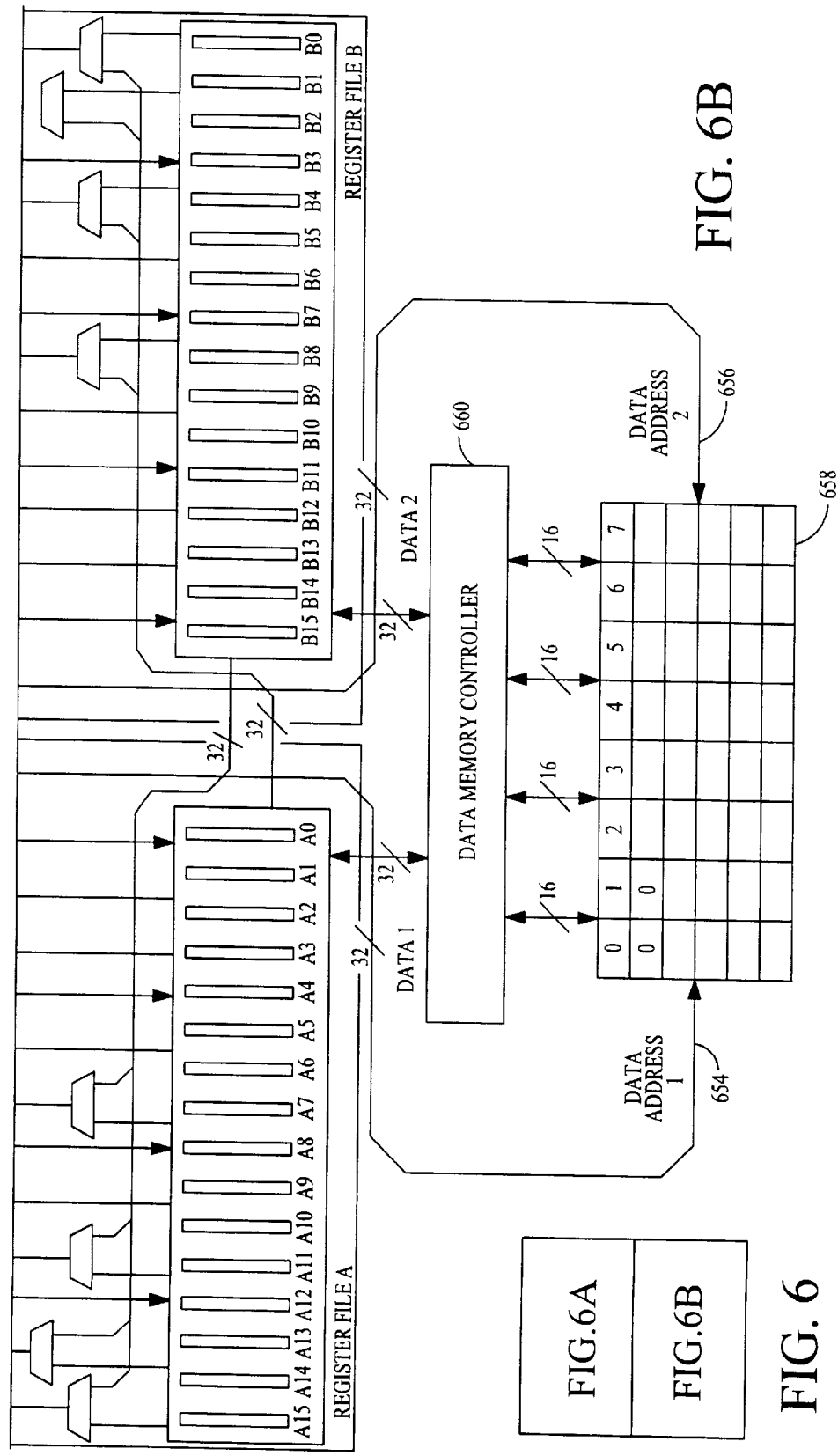

PROCESSOR WITH PROGRAMMABLE ADDRESSING MODES

REFERENCE TO RELATED APPLICATIONS

The present application claims priority benefit of U.S. provisional application No. 60/054,471, filed Aug. 1, 1997.

BACKGROUND OF THE INVENTION

1. Field of the Invention

This invention relates to the field of microprocessor architectures. More particularly, the invention relates to digital signal processors for array index intensive processing operations such as audio and video, digital signal processing, compression/decompression, and database applications.

2. Description of the Prior Art

A trend in microprocessor architecture evolution is to move away from Complex Instruction Set Computer (CISC) architectures which use many complex addressing modes. The CICS architectures are being replaced by Reduced Instruction Set Computers (RISC) which are based on a simple load-store architecture. In a load-store architecture, the arithmetic and logic instructions operate directly on internal registers. Data values are retrieved (loaded) from the memory and loaded into the data registers using a LOAD instruction. Data values are saved (stored) from the data registers into the memory using a STORE instruction. The LOAD and STORE instructions typically have a field which specifies a data register, and a field which specifies an address register. For example, a typical microprocessor would provide an instruction resembling "STORE R1, *R2" that instructs the processor to store the data in register R1 using a memory address found in register R2. Some DSPs do not allow the programmer to specify both the source register and the address register in the same instruction as shown above, but rather require that the user specify a "default" address register that is used for address register addressing. A typical DSP of this variety is the TMS320C2x series of DSPs offered by Texas Instruments Inc. On the TMS320C2x the above instruction would be written as two instructions: "LARP AR2", followed by "SAR AR1, *". The LARP instruction specifies an auxiliary register 2 (AR2) as the default address register and the SAR instruction stores the data in an auxiliary register 1 (AR1) at the address specified by the default address register (AR2). Note that the TMS320C2x is not a strict load-store processor, but it still includes load and store commands.

Use of the load-store architecture is based, in part, on the assumption that the number of load and store operations can be minimized by keeping data in registers. However, many application programs manipulate large data structures which are too big to be stored in registers and therefore must be stored in memory. Storing data in memory requires many load and store operations to perform calculations on the data. Each load operation and each store operation requires an address into the memory and these addresses are usually held in an address register (as in the example above, where register 2 was used as an address register.) Some processors provide separate data and address registers. Other processors have general purpose registers which can be used for addresses or data. Since an address register holds the address for a load or store operation, a new address value must be calculated and stored in the address register each time a new location in memory is to be accessed. An address stored in a register is often referred to as a "pointer" because it points to a location in memory. On RISC machines, the load-store architecture tends to result in programs that use many instructions to calculate the value of each pointer.

Digital Signal Processors (DSP) are computers that are designed to efficiently execute numeric signal processing algorithms. Programs running on a DSP typically need very fast multiply and accumulate pipelines, and also need to be able to efficiently manipulate data arrays stored in memory. In this sense, DSPs fall under the general classification of "array processors." Digital signal processors almost universally employ some form of addressing arithmetic logic unit, often called an Address Arithmetic Unit (AAU). The AAU is designed to quickly and efficiently calculate an address and store the calculated address in an address register. Note that some authors refer to the address registers as auxiliary registers and the AAU as an Auxiliary Register Arithmetic Unit (ARAU). The term "auxiliary" is used by these authors simply to point out that the address registers and the AAU can be used for purposes other than manipulating addresses. Addresses are usually no more than integer values and thus, clearly, any set of registers or arithmetic units designed to manipulate addresses can be used, to some extent, to do integer arithmetic. Nevertheless, the primary purpose for the address (auxiliary) registers and the AAU is to manipulate addresses. In many microprocessor architectures, especially Digital Signal Processor (DSP) architectures, the capabilities of the AAU to perform calculations beyond those needed for address computations are very limited. For example, most DSP architectures do not provide an AAU that can do multiplication and thus the AAU cannot be used as a general purpose arithmetic unit. Therefore, the term address register rather than auxiliary register will be used herein with the understanding that the address registers can be used for other purposes (some of the examples below show address registers being used for non-address purposes).

Most DSP architectures have an AAU that can increment an address stored in an address register by some fixed integer (usually 1, 4, or 8) or by an integer stored in another address register. The increment operation is performed automatically by instructions which use addressing modes known as auto-increment modes. For example, on the TMS320C2x series of DSPs, the instruction "SAR AR1, *+" stores the contents of AR1 at the location specified by the default address register and then increments the default address register by 1. The "*+" mnemonic tells the assembler to use an auto-increment address mode. The auto-increment operation is typically performed during the same clock cycle as the store operation and thus the increment is obtained without incurring any additional time delay. An auto-increment address mode makes the process of generating a linear sequence of addresses (e.g. 0, 4, 8, . . . ) very fast and simple. Auto-decrement modes are also known. The auto-increment and auto-decrement modes are specific examples of a general class of auto-update addressing modes.

More recently, AAUs have evolved to include auto-update addressing modes that provide for a few specialized non-linear sequences. For example, the Fast Fourier Transform (FFT) is ubiquitous in digital signal processing algorithms, and involves an addressing scheme called bit reversal. The bit reversal process, however, involves a non-linear addressing sequence that requires many program instructions to implement in software. Performing this type of indexing in software introduces significant overhead and greatly reduces system performance. Recognizing that the FFT will be needed in so many applications, some DSP manufactures have implemented special hardware in the AAU to provide a bit-reversed addressing mode which operates very much like an auto-increment address mode except that instead of incrementing the value in the address register, the bits in the address register are reversed (e.g. 1000 becomes 0001 after bit reversal). When running benchmarks involving FFT algorithms, the processors with hardware bit-reversed addressing modes are usually much faster than processors without hardware bit-reversed addressing. Thus, bit reversal is an example of an addressing mode that is time consuming to implement in software, but can be implemented very simply and efficiently in hardware.

Similar performance gains occur with many other signal processing algorithms. Modems and receivers commonly use a Viterbi algorithm to decode trellis encoded signals, and/or to combat the effects of inter-symbol interference. The Viterbi algorithm, like the FFT, has complicated non-linear addressing requirements. Without hardware support, address calculation involves many integer indexing operations that significantly slow down the already slow Viterbi algorithm. Processors which provide hardware support in the AAU for Viterbi addressing are known.

The FFT and Viterbi addressing modes discussed above are examples of special purpose hardware solutions to what are fundamentally software problems. Hardware solutions are typically more expensive than software solutions, and thus it takes many customers telling the DSP manufactures about a significant problem before the hardware solution is made available. When a specialized hardware solution is made available, it only benefits the specific problem it was designed to address. This process of waiting until the market gets large enough to implement an expensive feature in hardware is slow and inefficient at best.

Many algorithms currently being developed can benefit from specialized addressing modes, but no DSPs yet exist that provide an AAU with the specialized addressing modes needed for these new algorithms. MPEG-2 video decoding is an example of a new algorithm which does not yet enjoy widespread hardware support in DSP processors. In MPEG-2 there are specialized indexing requirements to compute two-dimensional discrete cosine transforms (DCTs) and various indexing sequences are needed to efficiently perform block scanning for frame and field processing. Still other indexing requirements appear in Huffman coding and in motion compensation used in MPEG-2 encoding. An MPEG-2 developer must either: use an existing DSP and program the special addressing modes; wait for a DSP manufacturer to release a new chip with specialized MPEG-2 indexing modes; or use a dedicated MPEG-2 decoder chip.

Still other signal processing algorithms that need special addressing modes include custom video decoders, wavelet based transformations, audio and video decoders based on new standards or new algorithms, etc. It is unfortunate that, to run efficiently, new signal processing algorithms having specialized addressing requirements must wait for special hardware features to be added to the AAU. One existing solution to this dilemma is to use DSP Application Specific Integrated Circuit (ASIC) technology. With an ASIC, cell libraries, and semi-custom techniques are used to implement a large portion of an application specific chip. A DSP core from the cell library, together with other functional blocks, including programmable logic arrays and other forms of ASIC programmable blocks, are combined to produce a custom chip that implements the desired signal processing algorithm. Unfortunately, this technique significantly extends time to market, is quite expensive, and is not user upgradeable. The ASIC approach can only be justified for high volume or higher cost applications.

Although the above discussion focuses on signal processing and DSP applications, database applications that manipulate database information have similar addressing problems. For example, the well known quick-sort algorithm has addressing requirements that are similar to the FFT. Database algorithms typically use complicated addressing schemes involving a high degree of memory indirection in their pointer manipulations.

Superscalar processors have a slightly different set of requirements. While it is important to keep the instruction timing constant in traditional RISC architectures, it is well known that superscalar architectures often use separate pipelines for the instructions that process data in registers and instructions that fetch data from memory into the registers. One objective of implementing a limited number of addressing modes in the RISC architecture is to keep the instructions simpler, and to reuse the same hardware over and over again instead of having a lot of hardware dedicated to many different modes that may not be used very often. This trade-off between simplicity and versatility means that more instructions are needed to perform the same function, and that the memory traffic, cache sizes, and execution time is increased.

SUMMARY OF THE INVENTION

The present invention solves these and other problems by providing an AAU that is programmable, thereby allowing a DSP programmer to create new addressing modes that fit the needs of new signal processing algorithms. One aspect of the present invention is a processor which can adapt the unique addressing requirements of many different algorithms by either supplementing or replacing the standard AAU with a Programmable Address Arithmetic Unit (programmable AAU). The programmable AAU performs a function similar to the traditional AAU, but the programmable AAU allows a programmer to define new addressing modes to fit the requirements of new signal processing algorithms. Thus, a DSP with a programmable AAU can efficiently provide very complex non-linear indexing schemes. The present invention further provides for efficient parallel hardware execution of memory intensive instructions on superscalar RISC processors without the need to unduly expand the number of addressing modes in the instruction set. Typically, the programmer will write two software modules to implement a signal processing algorithm on a DSP with a programmable AAU. The programmer will first write a programmable AAU software module that provides instructions to the programmable AAU. This software module will typically be loaded into a memory in the programmable AAU and thus enable the programmable AAU to perform the desired new address calculations. The programmer will then write a DSP software module that provides instructions to the DSP. The DSP software module will use the new addressing modes provided by the programmable AAU. A further aspect of the present invention is a means to load addressing mode configuration data into the programmable AAU at boot-up time, under program control, or via direct memory access (DMA).

Another aspect of the present invention is a processor having a memory for storing instructions and data. The memory may be split into a program memory and a data memory. The processor executes a set of instructions chosen from an instruction set including addressing modes to reference data stored in the data memory. Addresses may be calculated using a programmable AAU providing various logic functions according to a program stored in a programmable AAU memory. The processor may also provide instructions used to load data into the programmable AAU memory. Typically, the processor will have address registers that are used to provide addresses into the data memory. Data stored in the address registers is computed by the programmable AAU. The processor also includes an instruction decoder to decode the processor instructions and control how the programmable AAU computes values in the address registers. Data in the programmable AAU may be loaded by several methods including, a direct memory access (DMA) channel from the data memory, processor instructions, or from a hardware read only memory (ROM) at boot time. The programmable AAU can be any form of programmable logic device, including a micro-sequencer capable of performing multi-cycle operations, a programmable logic array, or a field programmable gate array.

Another aspect of the present invention is a processor that uses a dispatch circuit to provide instructions to many instruction units in a single instruction cycle, and a memory queue configured to queue memory requests from a programmable AAU. The programmable AAU includes a programmable AAU memory for storing program information to control the operation of the programmable AAU. The programmable AAU includes a logic array having a control feedback path to the programmable AAU which allows for sequencing of multi-cycle memory access operations. The processor also includes one or more data paths coupled between a register file, the logic array, and the memory queue controller to provide request signals to integrate memory accesses with other requesting sources from the system.

A further aspect of the present invention is a method for programming a programmable AAU by writing and compiling a program for a programmable AAU to provide various addressing functions and then writing a DSP program for the processor that uses the addressing functions. The DSP program preferably implements a desired digital signal processing algorithm and, when compiled, contains machine level instructions to control the programmable AAU. The programmable AAU program may be written in a hardware definition language such as VHDL. The DSP program may be written in any language, including C/C++ and assembler. If the programmable AAU provides special functions then a software designed to access these special functions may be used by either the programmable AAU program or the DSP program.

Yet another aspect of the invention is a Very Long Instruction Word (VLIW) processor having a load-store unit and multiple functional units that receive different dispatched portions of a VLIW. The load-store unit has an instruction decoder to decode the VLIW and to control the functional units. One or more of the functional units may be a programmable AAU.

BRIEF DESCRIPTION OF THE FIGURES

The various novel features of the invention are illustrated in the figures listed below and described in the detailed description which follows.

FIG. 4A illustrates a matrix "A" having four rows and four columns.

FIG. 4B illustrates one example of how the matrix of FIG. 4A may be stored in memory.

FIG. 4C illustrates a base field and an index field of a memory address for the matrix storage map of FIG. 4B.

DETAILED DESCRIPTION OF THE PREFERRED EMBODIMENT

Figure 1:
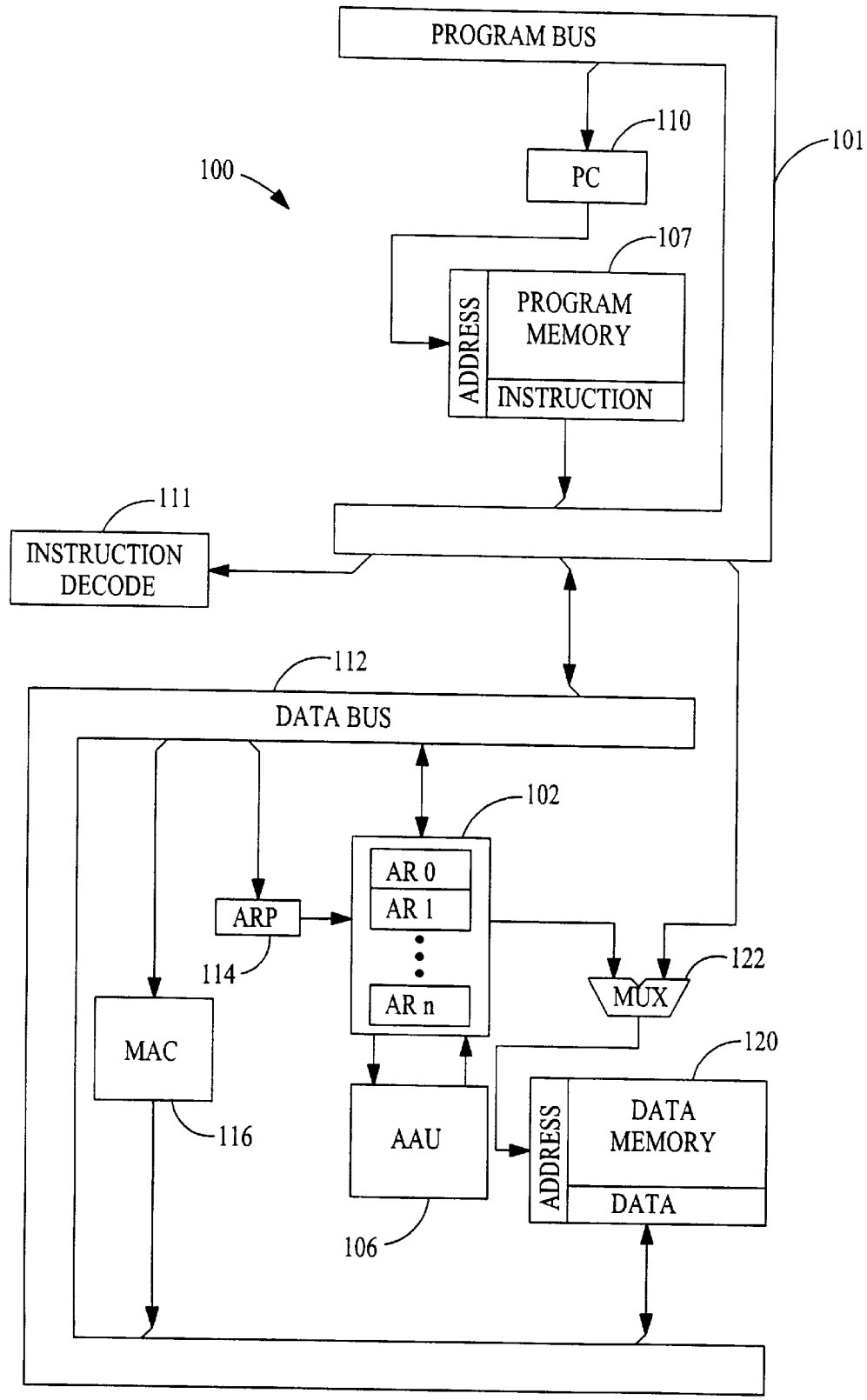
FIG. 1 is a block diagram that illustrates the elements of a typical Digital Signal Processor that provides address calculation using an Address Arithmetic Unit.

The present invention improves upon the prior art by supplementing the fixed address arithmetic units of the prior art with a programmable address arithmetic unit (programmable AAU). A programmer using the programmable AAU can create new addressing modes as needed to efficiently implement new signal processing algorithms without having to wait for DSP hardware designs to "catch up" with algorithm development. For example, in the prior art an AAU could be used by an instruction to provide an auto-increment addressing mode to automatically increment by some fixed amount a memory address stored in an address register. In an auto-increment addressing mode, each time the memory address contained in the address register is used, say in a store operation, the address is automatically incremented by some fixed amount. Using an auto-increment addressing mode, it is relatively easy for a programmer to generate a sequence of addresses such as 0, 1, 2, 3, etc.

Using the present invention, the AAU, which is the logic block that increments the address, is either replaced or supplemented by a programmable AAU (programmable AAU). The programmable AAU can be programmed by a programmer such that an auto-update instruction will update (e.g. increment) an address according to the needs of programmer desiring to implement a new signal processing algorithm. For example, in implementing a specific algorithm, a programmer may require that an address increment forward by eight on every even clock cycle, backwards by four on every odd clock cycle, and jump forward an additional four on every fourth clock cycle, thus generating the sequence of addresses 0, 8, 4, 12, 12, 20, 16, etc. In the prior art, generating this sequence required many DSP instructions and many clock cycles. With the present invention, a programmer can program the address arithmetic unit to automatically generate the desired sequence such that repetitive use of an auto-update type of instruction (e.g. STORE R1,R2++) generates the desired sequence. In a preferred embodiment, a new address in the sequence can be generated in one clock cycle.

Another example of auto-increment type of address arithmetic is found in the bit reversal addressing modes that are commonly used to implement FFT algorithms. Bit reversal, loosely speaking, provides for reversing the order of the least significant bits in an address register. Given an 8-bit register containing the value 01001000b (the b suffix meaning binary), reversing the order of the lowest four bits in the register gives the value 01000001b. With a programmable AAU, as disclosed herein, a DSP programmer can provide for other bit rearrangement schemes such as rotating the lowest four bits by two, which would turn 01001000b into 01000010b. Such a rotation is not provided by present DSP architectures, but is very useful when performing matrix calculation as shown below in the text relating to FIGS. 4A–4C.

A DSP program may access (use) the addressing functions programmed into the programmable AAU by using existing auto-update addressing modes of the DSP. Alternatively, a DSP program may access the programmable AAU addressing functions through new auto-update addressing modes provided by the DSP specifically for accessing the programmable AAU. In the latter case, new assembler mnemonics are advantageously provided for writing programs that use the new addressing modes. In a preferred embodiment, the mnemonics "*+" and "*−" refer to auto-increment and auto-decrement addressing modes and the new assembler mnemonic "*++" refers to a programmable auto-update mode provided by the programmable AAU. Alternatively, the programmable AAU may advantageously provide a plurality of programmable auto-update modes accessed by an instruction that selects the "current" programmable address mode from the plurality of programmable auto-update modes. In a preferred embodiment, the current programmable addressing mode is specified by a "select address mode" instruction with an assembler mnemonic "SAM" such that a current programmable addressing mode number two is specified as "SAM 2". Alternatively, the programmable AAU may advantageously provide a plurality of programmable auto-update modes accessed by a plurality of new assembler mnemonics (e.g. "*++*1", "*++*2", etc.).

Operation of the programmable AAU is most easily explained by comparing a DSP without the programmable AAU to a DSP with the programmable AAU. FIG. 1 is a block diagram that illustrates a conventional DSP 100 having a conventional (non-programmable) AAU 106. The AAU 106 may be a simple arithmetic logic unit that provides addition and shifting operations and, optionally, may provide more complex operations such as bit-reversal. A register set 102 comprising address registers AR0, AR1, . . . ARn provides data to an input of the AAU 106. A bi-directional data path connects the register set 102 to a data bus 112. An output of the AAU 106 also provides data to the register set 102. A second output of the register set 102 provides data to a first input of an address multiplexer 122. A second input of the address multiplexer 122 receives data from a program bus 101. An output of the address multiplexer 122 is provided to an address input of a data memory 120. The data memory 120 is provided with a bi-directional data path to the data bus 112. The data bus 112 provides data to an input of a multiply-accumulator 116 and an output of the multiply-accumulator (MAC) 116 provides data back to the data bus 112. The data bus 112 also provides data to an input of an address register pointer 114. An output of the address register pointer 114 selects a register from the register set 102 to use as the default address register. A bi-directional data path connects the data bus 112 with the program bus 101. An output of a program counter 110 provides an address to a program memory 107 which, in turn, provides an instruction to the program bus 101. An instruction decoder 111 receives data from the program bus 101.

The processor 100 is typical of high performance digital processors that are based on a Harvard-type architecture. The Harvard architecture improves processing throughput by maintaining two separate memory bus structures: the program bus 101 and the data bus 112. The present invention may also be used with other architectures. A program is stored in the program memory 107 as a sequence of instructions. The program data bus 101 carries the instruction code and immediate operands from the program memory 107. Program data is stored in the data memory 120 and carried by the data bus 112 which interconnects various elements, such as the MAC 116, the register set 102.

The MAC 116, comprising a multiplier, an Arithmetic Logic Unit (ALU), an accumulator, and one or more shifters, is the primary arithmetic computational unit of the processor 100. The ALU is a general-purpose arithmetic unit which can perform operations such as add, subtract, Boolean logic, and shifting operations. A first input of the ALU receives data from either from the data bus 112, from the program bus 101 (e.g. during immediate instructions which have data as part of the instruction), or from the multiplier. The accumulator stores the output from the ALU and also provides data to a second input of the ALU. The multiplier provides two's complement multiplication in a single instruction cycle.

The processor 100 uses the program counter 110 to step through a sequence of program instructions stored in the program memory 107. To fetch a program instruction, the processor 100 increments the program counter 110. The instruction referenced by the program counter 110 is fetched from the program memory 107 and placed on the program bus 101. The decoder 111 receives the instruction data from the program bus 101 and decodes the instruction. The decoder 111 then directs the other elements of the processor 100 to perform the functions specified by the instruction. For example, when the instruction on the program bus 101 is the "STORE AR1, *+" instruction discussed above, the processor performs the following actions (assuming that AR0 is the default address register): (1) set the multiplexer 122 to select an address from the default address register (e.g. AR0), (2) put the data in AR1 on the data bus 112, (3) store the data on the data bus 112 in the data memory 120 at the address specified by the default address register, (4) use the AAU 106 to increment the address in the default address register. These four steps may be performed during multiple clock cycles, or one or more of the steps may be performed during a single clock cycle.

Figure 2:
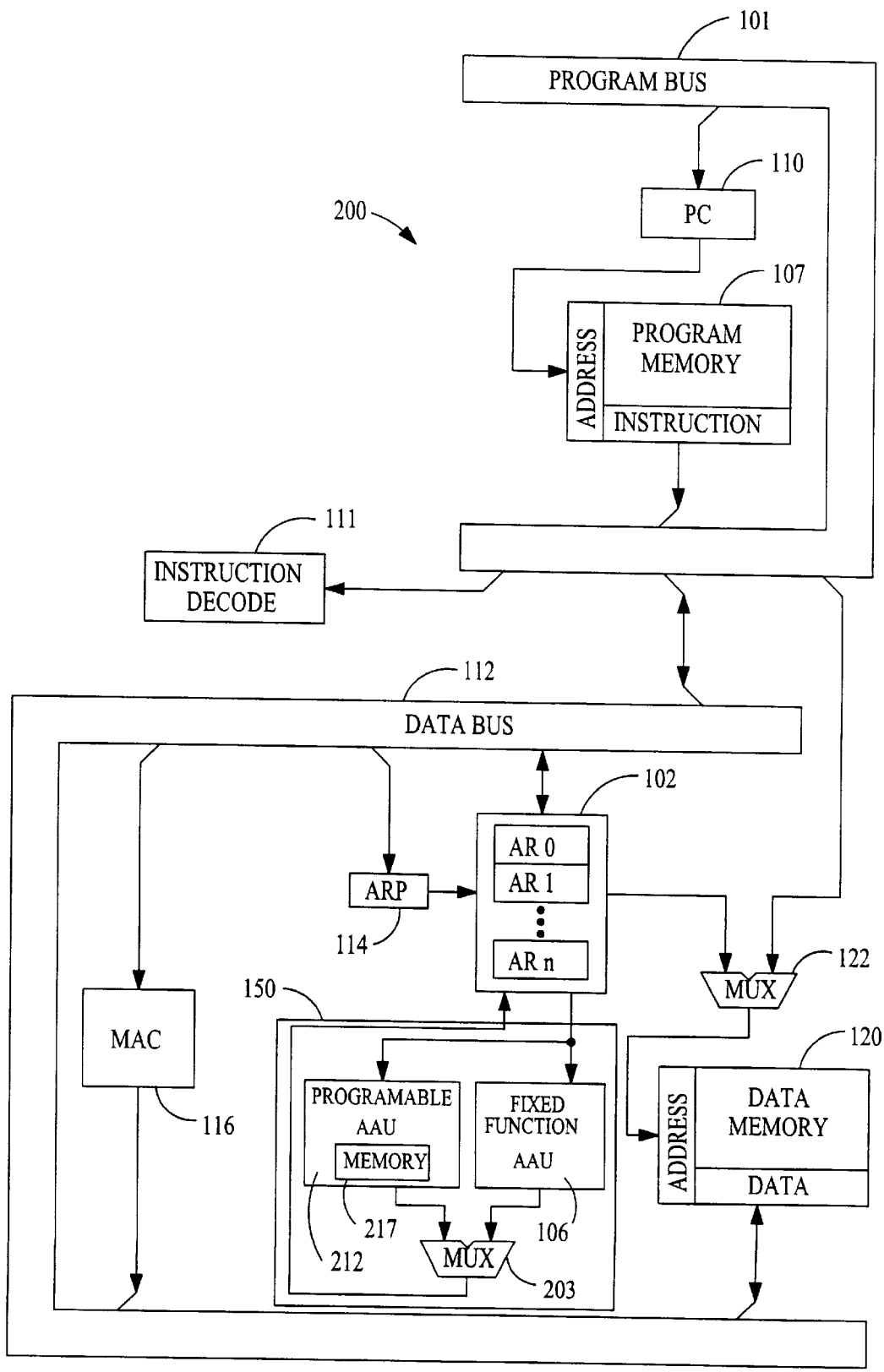
FIG. 2 is a block diagram that illustrates a Digital Signal Processor which provides programmable address computation using a programmable Address Arithmetic Unit.

FIG. 2 illustrates one embodiment of a processor 200 that provides programmable address calculation using a programmable AAU 212. The processor 200 provides all of the elements of the processor 100, except that the output of the AAU 106 is not provided directly back to the register set 102, but rather, the output of the AAU 106 is provided to a first input of a multiplexer 203. The processor 200 also provides the programmable AAU 212 which receives input data from the register set 102. An output of the programmable AAU 212 is provided to a second input of the multiplexer 203. An output of the multiplexer 203 is provided to the register set 102.

The programmable AAU 212 may be a programmed logic array (PLA), a field programmable gate array (FPGA), a micro sequencer, or any other programmable function block. The programmable AAU 212 is responsive to the instruction set of the processor 200 and to the data in the registers set 102. The programmable AAU 212 produces an output which is a function of the input from the register set 102 and programming information stored in an AAU program memory 217 in the programmable AAU 212. The programmable AAU 212 may contain combinatorial logic as well as internal registers and feedback paths to implement sequential logic functions. By including the data paths shown in FIG. 2, addresses stored in the address register set can be manipulated efficiently in hardware without the need for complex indexing software, and without the need for specialized hardware. For example, the programmable AAU 212 can be programmed to provide automatic address indexing for FFT processing, Viterbi decoding, discrete cosine transforms, circular buffers, etc.

In a preferred embodiment, the programmable AAU 212 is user programmable and incorporates a memory 217 to store the programmable AAU program. The memory 217 may be any memory technology, including Random Access Memory, an Eraseable Programmable Read Only Memory, an Electrically Eraseable Programmable Read Only Memory, a Programmable Read Only Memory, Fuseable Links, or Anti-Fuses. To program the programmable AAU 212, data is loaded into the memory 217. In one embodiment, a special processor instruction is used to insert data into the memory 217. In an alternate embodiment, the memory 217 is mapped into the memory space of the program memory 107 or the data memory 120 such that the programmable AAU memory 217 can be programmed simply by writing to the mapped memory locations. In yet another embodiment, the programmable AAU memory 217 is loaded by a direct memory access operation. The memory 217 may be eraseable and rewriteable such that a programmer can modify the program stored in the memory 217 or the memory 217 may be write-once memory which cannot be changed once a program has been loaded.

Crossbar Embodiment

Figure 3A:
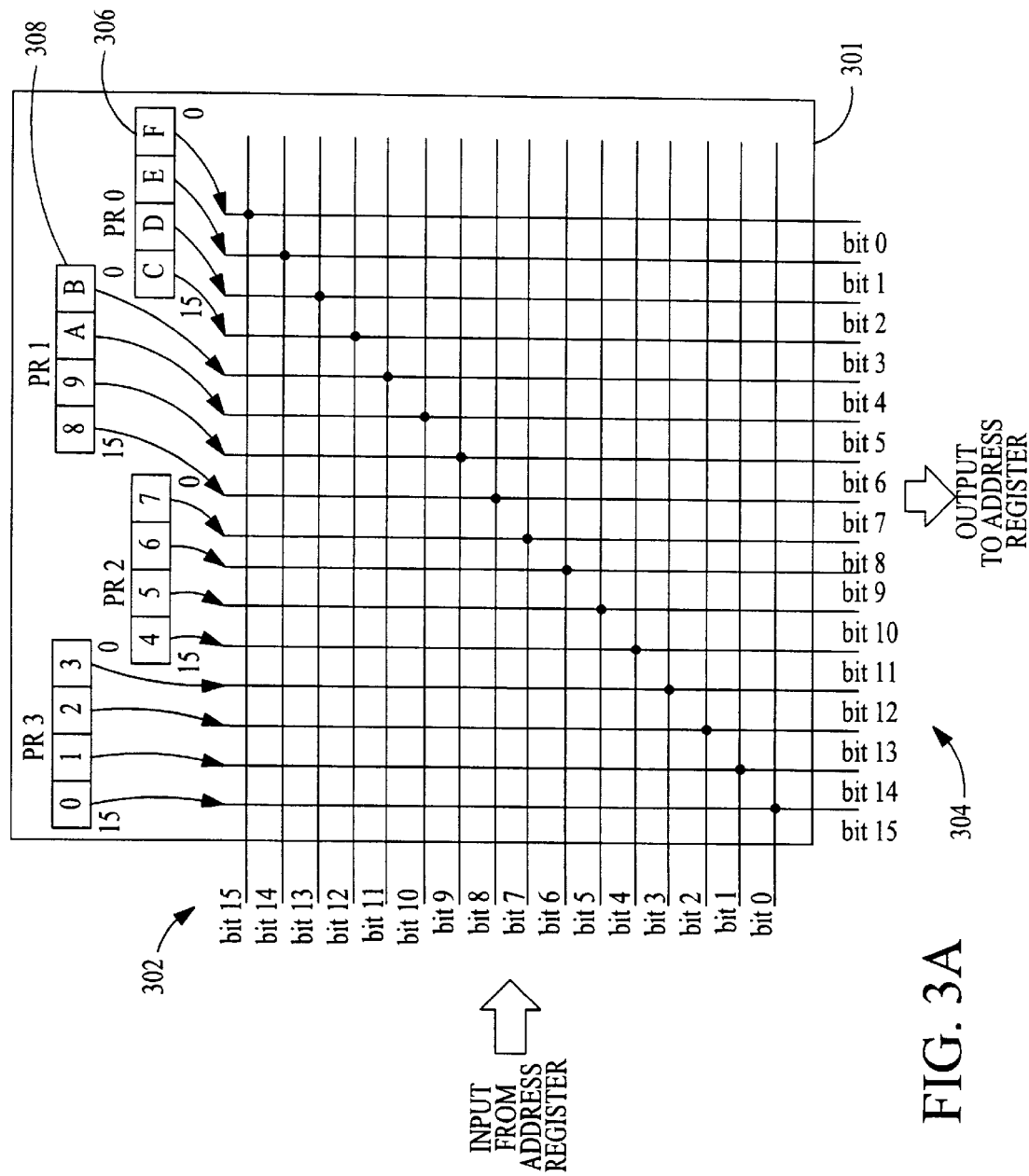
FIG. 3A illustrates a functional block diagram of a programmable AAU which is implemented as a cross-bar switch that reverses all of the bits in a 16-bit word.
Figure 3B:
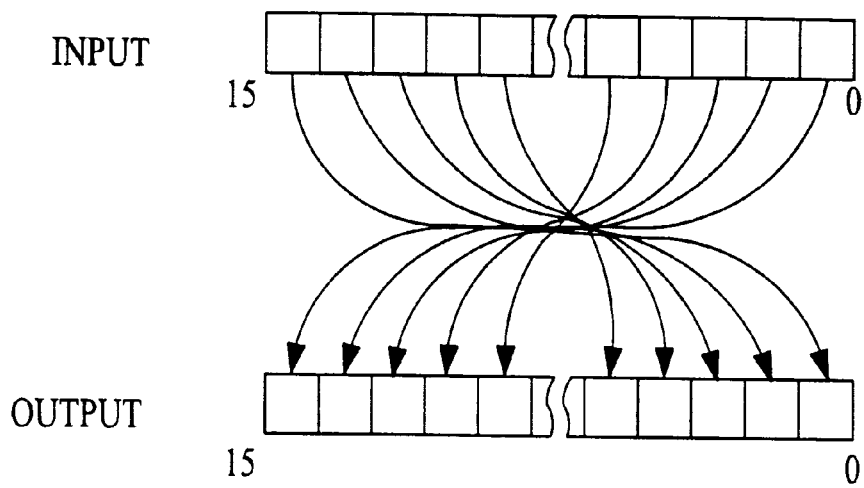
FIG. 3B illustrates the bit reversal process provided by the programmable AAU in FIG. 3A.

FIG. 3A illustrates a functional block diagram of one embodiment of the programmable AAU 212. The embodiment illustrated in FIG. 3A is a programmable AAU 301 which is configured as a cross-bar switch that accepts a 16-bit input word 302 and rearranges the bits therein to produce a 16-bit output word 304. The programmable AAU 301 is programmable such that the bits can be rearranged in any order. For purposes of illustration, the programmable AAU 301 is shown in FIG. 3A as being programmed to reverse all of the bits in the 16-bit word (as shown in FIG. 3B). The words 302 and 304 each consist of 16-bits labeled bit 0 (least significant) through bit 15 (most significant). The programmable AAU 301 has 16 horizontal lines, each line corresponding to a bit in the input byte 302, and 16 vertical lines, each line corresponding to a bit in the output byte 304. A connection between a vertical line and a horizontal line is indicated by a dot at the junction between the lines. The programmable AAU 301 is programmed by loading data into a program register 0 (PR0) 306, a program register 1 (PR1) 307, a program register 2 (PR2) 308, and a program register 3 (PR3) 309. Each of the program registers PR0–PR3 306–309 is one word (sixteen bits). In this embodiment, the AAU memory 217 comprises the program registers PR0–PR3 306–309. Bits 0–3 of the register PR0 306 determine which bit in the input word 302 is mapped to bit 0 in the output word 304, bits 4–7 of the register PR0 306 determine which bit in the input word 302 is mapped to bit 1 in the output word 304, etc. This sequence is continued through all of the bits in the register PR0. The sequence is also continued in the register PR1–PR3 307–309. Thus, bits 0–3 of the register PR1 307 determine which bit in the input word 302 is mapped to bit 4 in the output word 304, and so forth. As shown, the programmable AAU 301 can map any bit in the input word 302 to any bit in the output word 304. For example, to simply map the input bits directly to the corresponding output bits (input bit 0 to output bit 0, input bit 1 to output bit 1, etc.), the registers PR0–PR3 would be loaded as follows: PR3=FEDCh (where "h" indicates hexadecimal notation), PR2=BA98h, PR1=7654h, PR0=3210h. To perform a bit reversal, as shown in FIG. 3B, where input bit 0 is mapped to output bit 15, input bit 1 is mapped to output bit 14. etc., the registers are loaded as follows: PR3=0123h, PR2=4567, PR1=89ABh, PR0=CDEFh.

Figure 3D:
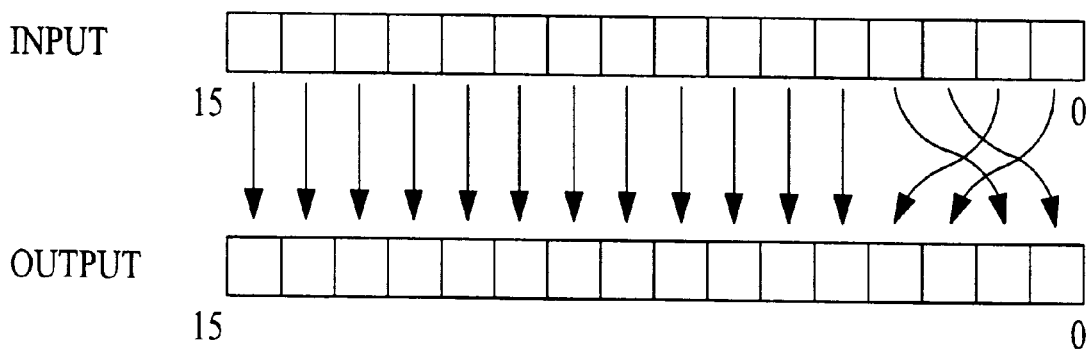
FIG. 3D illustrates the bit rotate process provided by the programmable AAU in FIG. 3C.
Figure 3C:
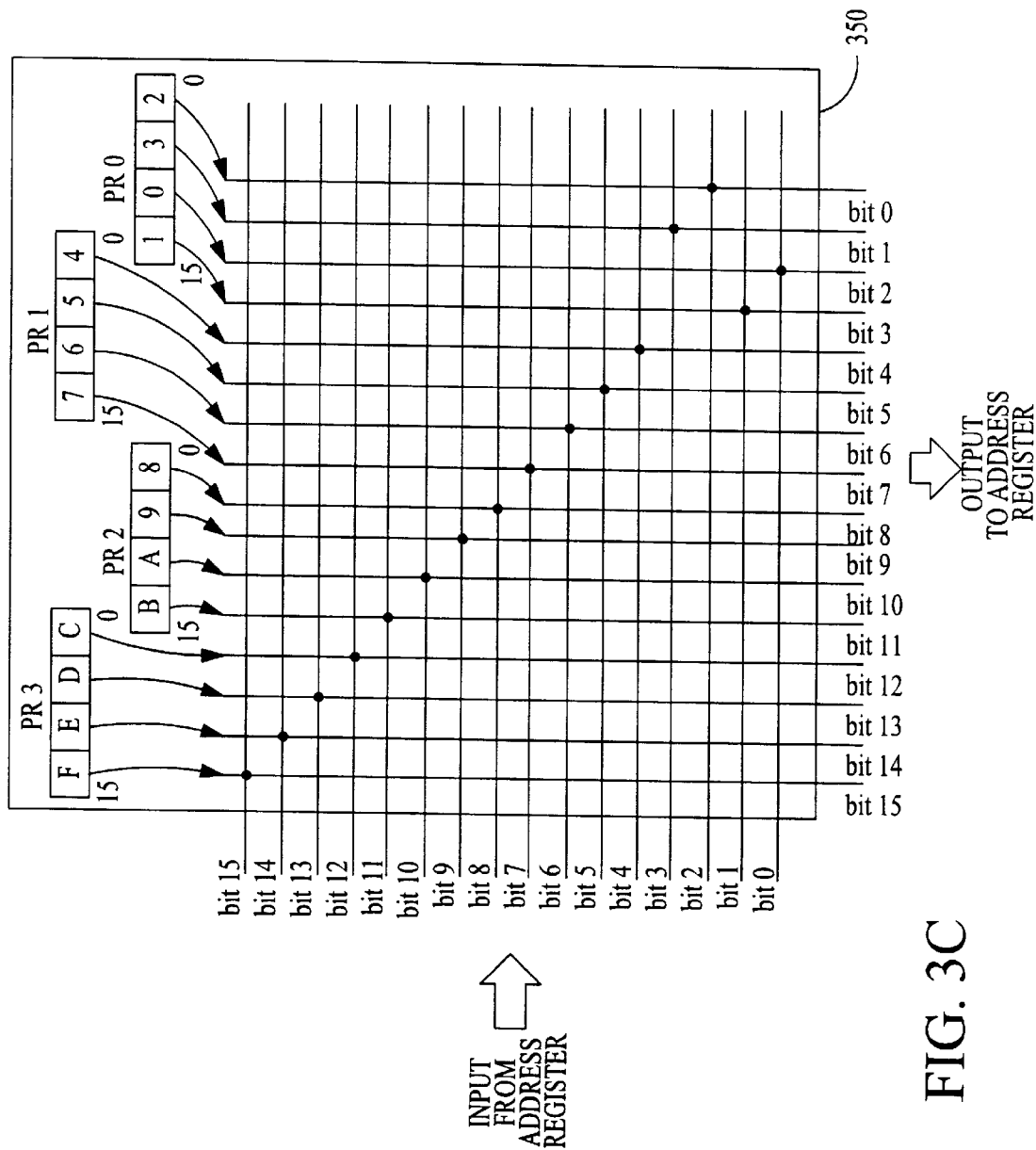
FIG. 3C illustrates a functional block diagram of a programmable AAU which is implemented as a cross-bar switch that rotates the four low order bits of a 16-bit word.

The programmable AAU 301 thus provides the capability to programmably permutate the bits in a 16-bit word. Using the programmable AAU 301 as the programmable AAU 212 in the processor 200 shown in FIG. 2, allows a programmer to programmably permutate the bits in the address registers AR0–ARn in the register set 102. The ability to arbitrarily permutate the bits in an address register provides many capabilities not seen in the prior art. For example, as shown in FIGS. 3C and 3D, the programmable AAU 301 can be programmed to provide an output which consists of a two bit rotate on only the four least significant bits in the input word. To accomplish this, the registers PR0–PR3 306–309 are loaded as follows: PR3=FEDCh, PR2=BA98h, PR1=7654, PR0=1032. This function is useful for generating addresses in a matrix when performing matrix arithmetic.

FIG. 4A illustrates a matrix "A" 400 having sixteen elements arranged in four rows and four columns. The elements of the matrix A 400 are denoted A(0,0), A(0,1) . . . A(i,j) . . . A(3,3), where the "i" index indicates the row and the "j" index indicates the column. FIG. 4B illustrates how the matrix 400 would typically be stored in memory. As shown in FIG. 4B, in memory, the sixteen elements of the matrix 400 are laid out sequentially in memory starting at an address 32d (where the "d" indicates decimal) or 0020h through 47d (002Fh). Note that the twelve most significant bits of the memory address for each element in the matrix 400 are always the same and that the lowest four bits of the memory address for each element correspond to the "distance" from the first element. Thus, as shown in FIG. 4C, the memory address of an element can be interpreted as the combination of a base address and a displacement (or index). Any square matrix having $2^n$ elements per row will have an index field that is 2n bits wide. The address of an element in such a matrix may be expressed in base-index form similar to FIG. 4C as long as the matrix is stored in memory at a location where the index of the first element of the matrix is zero.

It is common in computer programs that deal with matrices, such as the matrix 400, to interchange elements within the matrix. One very common type of interchange is the transpose wherein A(i,j) is interchanged with A(j,i) (e.g. interchange A(1,3) with A(3,1)). Typically, a programmer needing to transpose elements will generate the address of one of the elements to be transposed (e.g. the address of A(1,3)), and then use that address to compute the address of the transpose element (e.g. A(3,1)). Addressing arithmetic is needed to efficiently compute the address of A(j,i) since the matrix 400 is actually stored as a linear array in memory. Two additions and a multiply are needed to compute the transpose address using standard techniques. If the matrix size is a power of two, then two additions and a barrel shift are required. Since the AAU on a typical DSP, such as the TMS320C2x, does not support multiplies and shifts, multiple clock cycles are needed to compute the address in the conventional way.

Table 1 lists the index portion of the memory address for each element in the matrix 400 which can be transposed. Each line of Table 1 contains one transpose pair. Examination of the indices in Table 1 reveals that the indices of each transpose pair are related by a two bit rotate, either left or right. Given the index for one element, the index for the transpose element can be computed by a simple two bit rotate. Recall, however, that the base portion of the memory address of each matrix element is the same. Thus, to generate the address of the transpose element, only the lowest four bits (the index portion) of the address are rotated.

TABLE 1

| | element | index | element | index |
|---|---|---|---|---|
| 1. | A(0,1) | 0001b | A(1,0) | 0100b |
| 2. | A(0,2) | 0010b | A(2,0) | 1000b |
| 3. | A(0,3) | 0011b | A(3,0) | 1100b |
| 4. | A(1,2) | 0110b | A(2,1) | 1001b |
| 5. | A(1,3) | 0111b | A(3,1) | 1101b |
| 6. | A(2,3) | 1011b | A(3,2) | 1110b |

Table 2 lists the assembly code and the number of clock cycles used to directly convert a matrix element address to a transpose address on the TMC320C2x processor. Since the TMC320C2x processor does not provide an instruction to rotate only the lowest four bits of a register, the code in Table 2 requires many instructions to mask off portions to be rotated, save the masked portions, perform the rotate, etc. As shown in Table 2, generating the transpose address uses fourteen clock cycles. (One skilled in the art will realize that for a small matrix, such as the matrix 400, the code in Table 2 could be streamlined by using a lookup table, however, a lookup table would be as large as the matrix, and thus the lookup table quickly becomes impractical as the size of the matrix increases. The code in Table 2 is therefore considered to be more representative of real world code for a medium to large sized matrix.)

TABLE 2

Sample macro to transpose a matrix address using a TMC320C2x without a programmable address unit

| | cycles | code | | |
|---|---|---|---|---|
| 1. | | * | Macro to transpose an address of an element | |
| 2. | | * | from a 4 by 4 matrix, the address is in SRC | |
| 3. | | * | mirrored address is put in DEST | |
| 4. | | TEMP | .word | ; temporary storage |
| 5. | | BASE | .word | ; base portion of address |
| 6. | | NDX | .word | ; index portion of address |
| 7. | | BM | DATA >FFF0 | ; mask to extract base |
| 8. | | IM | DATA >000F | ; mask to extract index |
| 9. | | | | |
| 10. | | MIRROR $MACRO SRC, DEST | | ; begin macro MIRROR |
| 11. | 1 | SAR | :SRC:, TEMP | ; save address |
| 12. | 1 | LAC | TEMP | ; load address |
| 13. | 1 | AND | BM | ; zero index bits |
| 14. | 1 | SACL | BASE | ; store base address |
| 15. | 1 | LAC | TEMP, 2 | ; load address and |
| 16. | | | | ; shift left 2 |
| 17. | 1 | AND | IM | ; zero base address bits |
| 18. | 1 | SACL | NDX | ; store index |
| 19. | 1 | LAC | TEMP | ; load address |
| 20. | 1 | AND | IM | ; zero base address bits |
| 21. | 1 | SFR | 4 | ; shift right 4 |
| 22. | 1 | OR | IM | ; or with stored index bits |
| 23. | 1 | OR | BASE | ; or with base address |
| 24. | 1 | SACL | TEMP | ; store mirrored address |
| 25. | 1 | LAR | :DEST:, TEMP | ; load mirrored address to dest |
| 26. | | $END | | ; end macro MIRROR |

By contrast, the programmable AAU 350 shown in FIG. 3C can calculate the transpose address in one clock cycle. Table 3 list the code to compute the transpose address using a TMS320C2x to which the programmable AAU 350 has been added, as shown in FIG. 2. The code in Table 3 assumes that the PR0–3 registers of the programmable AAU 350 are mapped into the program memory of the processor. Lines 6–9 in Table 3 load the registers PR0–3. Alternatively, the TMS320C2x processor could be modified by the addition of a new instruction to load the PR registers. For example, an instruction "LPR PR0, >1032" could be designed to load the register PR0 with the value 1032h. The only executable statement in Table 3 is the MAR instruction in line 12. Comparing the code in Table 2 with the code in Table 3 shows that the programmable AAU 350 reduces the time needed to compute the transpose address from 14 clock cycles to 1 clock cycle.

By contrast, Table 5 lists the code to perform the swap operation on a TMS320C2x to which the programmable AAU 350 has been added. The TMS320C2x assembler uses the notation "*+" to indicate auto-increment addressing. The new "*++" notation in Table 5 is similar to the auto-increment notation "*+" except that the *++ is intended to

TABLE 3

Sample macro to transpose an array address on a DSP with a programmable address unit

| cycles | code | | | |
|---|---|---|---|---|
| 1. | * | Macro to transpose the address of a matrix element | | |
| 2. | * | in a 4 by 4 matrix by using a | | |
| 3. | * | programmable crossbar address unit | | |
| 4. | * | the address is stored in AR1 | | |
| 5. | * | data to configure the 16 by 16 crossbar | | |
| 6. | PR3 | DATA | >FEDC | ; crossbar register 0 |
| 7. | PR2 | DATA | >BA98 | ; crossbar register 1 |
| 8. | PR1 | DATA | >7654 | ; crossbar register 2 |
| 9. | PR0 | DATA | >1032 | ; crossbar register 3 |
| 10. | * | | | |
| 11. | PMR | $MACRO | | |
| 12. 1 | | MAR | *++ | ; transpose the address |
| 13. | | $END | | |

In many cases, the one clock cycle MAR instruction shown in the macro in line 12 of Table 3 is not needed because the address can be computed using an auto-update address mode. An auto-update address mode can be accessed from most instructions in the DSP instruction set. For example, consider the swap operation wherein a matrix element and its transpose element are interchanged (e.g. the value of A(1,3) is interchanged with the value of A(3,1)). Table 4 shows the code needed to perform the swap using the TMS320C2x assuming the auxiliary register pointer is initially set to zero. The swap requires eighteen cycles, 14 cycles to generate the transpose address and four cycles to do the actual swap. The code also requires four registers, one to hold the address, one to hold the transpose address, and two to hold the data.

instruct the processor to use the programmable AAU 350. Assuming that the registers PR0–PR3 have been properly loaded, the programmable AAU 350 will compute the transpose address. Thus, the swap operation in Table 5 requires only four clock cycles because the calculation of the transpose addresses can be performed simultaneously with the load and store operations. Further, the code in Table 5 only uses three registers, one to hold the addresses and two to hold the data. Only one register is needed to hold the addresses because on each instruction, the address in the register is converted into the address of the corresponding transpose element.

TABLE 4

Sample code to swap matrix elements using a TMS320C2x without a programmable address unit

| | Cycles | Code | | |
|---|---|---|---|---|
| 1 | 14 | MIRROR | AR0, AR1 | ; copy mirrored address into AR1 |
| 2. | 1 | LAR | AR4, *; 1 | ; AR4 = a(i,j), make AR1 the default |
| 3. | 1 | LAR | AR5, * | ; AR5 = a(j,i) |
| 4. | 1 | SAR | AR4, *, 0 | ; a(j,i) = AR4, make AR0 the default |
| 5. | 1 | SAR | AR5, *, | ; a(i,j) = AR5 |

TABLE 5

Sample code fo swap matrix elements in a DSP with programmable address unit

| | Cycles | Code | | |
|---|---|---|---|---|
| 1. | 1 | LAR | AR4, *++ | ; AR4 = a(i,j), and transpose the address |
| 2. | 1 | LAR | AR5, *++ | ; AR5 = a(j,i), and transpose the address |

TABLE 5-continued

Sample code fo swap matrix elements in a DSP
with programmable address unit

| Cycles | | Code | | |
|---|---|---|---|---|
| 3. | 1 | SAR | AR5, *++ | ; a(i,j) = AR5, transpose the address |
| 4. | 1 | SAR | AR4, *++ | ; a(j,i) = AR4, transpose the address |

Programmable Arrays

The programmable AAU 301 (or 350) is a very simple example of a programmable logic unit. In another embodiment of the present invention, the programmable AAU 217 is a Programmable Logic Array (PLA), Programmable Logic Device (PLD), or a Field Programmable Gate Array (FPGA) which can be user programmed, like a RAM or ROM. PLAs and PLDs are typically devices that provide an output which is some combinatorial logic function of the input. These devices typically provide an output which can be expressed as a sum-of-products (AND-OR) of the inputs. In other words, in a PLA or PLD, each input is fed to a collection of AND gates. The outputs of these AND gates are OR'ed together to form the outputs.

Figure 5:
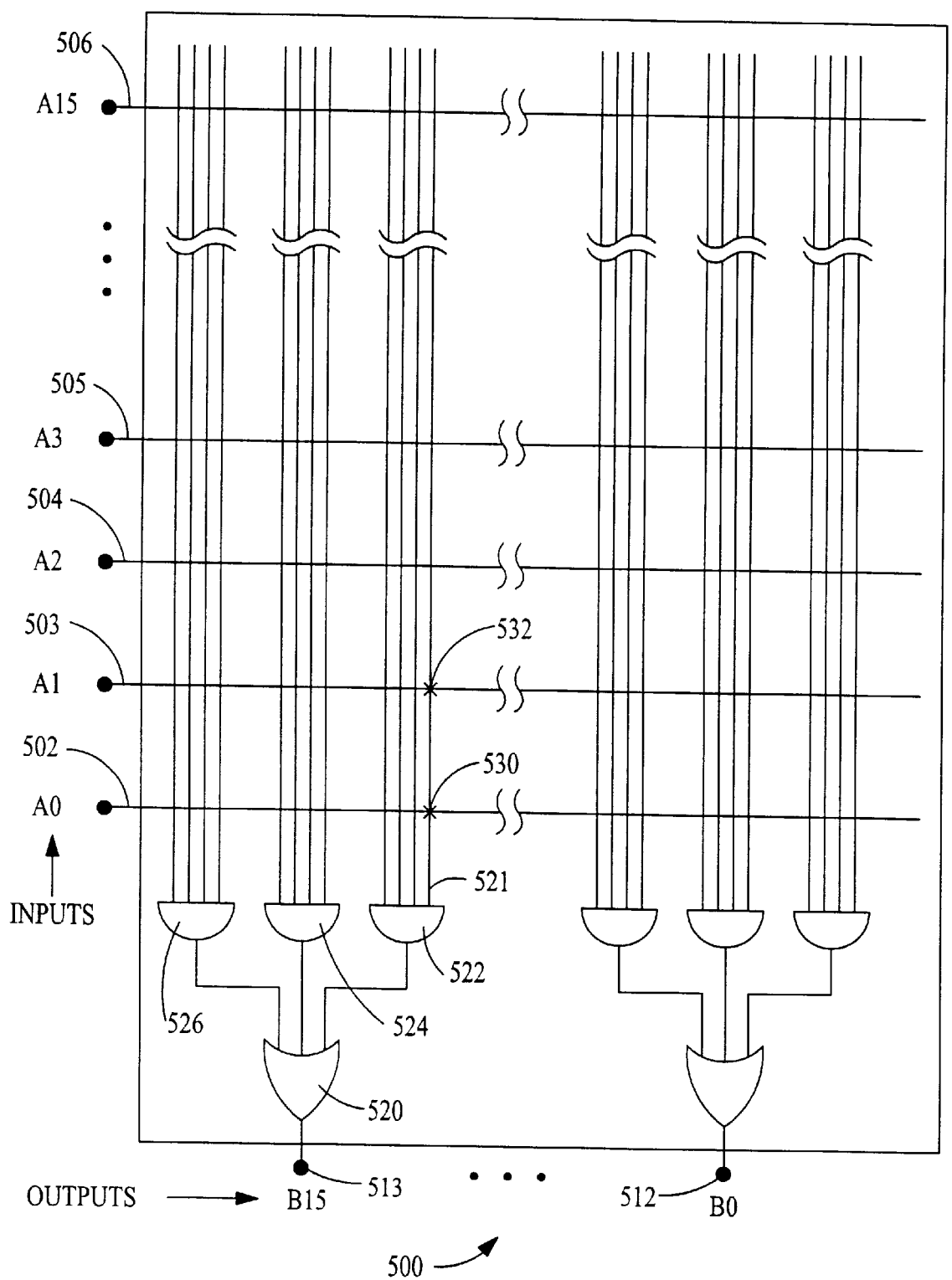
FIG. 5 is a block diagram that illustrates one embodiment of a Programmable Logic Array (PLA).

FIG. 5 shows a simple example of a PLA 500 which could be used as the programmable AAU 212 in FIG. 2. The PLA 500 can perform the bit rearranging operation provided by the cross-bar switch AAU shown in FIG. 3, and, the PLA 500 can provided higher level combinatorial functions not provided by the cross-bar switch. The PLA 500 has sixteen inputs A0–A15, comprising input lines 502–506 and sixteen outputs B0–B15 comprising output lines 512–513. The output line 513 is driven by an output of a three input OR gate 520. The first input of the OR gate 520 is provided by an output of a four input AND gate 526, the second input of the OR gate 520 is provided by an output of a four input AND gate 524, and the third input of the OR gate 520 is provided by an output of a four input AND gate 522. The four input lines of the AND gates 522, 524 and 526 cross all of the input lines 502–506 thereby creating a plurality of intersections. Each time one of the AND gate input lines crosses one of the input lines 502–506, an intersection is created. For example, the first input line of the AND gate 522 is a line 521. The line 521 crosses over all of the input lines 502–506. The point where line 521 crosses the input line 502 creates an intersection 530 and the point where the line 521 crosses the input line 503 creates an intersection 532. Whether or not the intersection 530 connects the line 502 to the line 521 is determined by how the user programs the PLA. The user may program the PLA such that the intersection 530 connects the line 502 to the line 521. Alternatively, user may program the PLA such that the intersection 530 does not connect the line 502 to the line 521. All of the intersections may be similarly programmed. Thus, in the PLA 500, the user may program any output $B_j$ as follows:

$$B_i = A_j A_k A_l A_m + A_n A_o A_p A_q + A_r A_s A_t A_u + A_v A_w A_x A_y \qquad (1)$$

where i,j,k,l,m,n,o,p,q,r,s,t,u,v,w,x,y=0 . . . 15
The simple PLA of FIG. 5 is used to illustrate the use of a PLA as a programmable AAU. More complicated PLA structures are known in the art and the use of other PLA, Programmable Array Logic (PAL), or PLD devices as a programmable AAU are within the scope of the present invention.

FPGAs are similar to PLAs, PALs, and PLDs, but FPGAs are complex enough to implement more than simple combinatorial logic. Complex designs including combinatorial and sequential logic with up to several thousands gates and latches may be implemented in an FPGA. To efficiently exploit the logic capacity of FPGAs, synthesis tools and efficient synthesis methods for FPGAs are desirable. FPGA designs can be described either with schematic layout tools or using synthesis from a hardware description language model such as VHDL-1076. VHDL-1076 (VHSIC (Very High Speed Integrated Circuits) Hardware Description Language) is a programming language for describing hardware circuits. VHDL has been an Institute of Electrical and Electronics Engineers (IEEE) standard since 1987. VHDL is "a formal notation intended for use in all phases of the creation of electronic systems . . . it supports the development, verification, synthesis, and testing of hardware designs, the communication of hardware design data . . . " [Preface to the IEEE Standard VHDL Language Reference Manual] and especially simulation of hardware descriptions. VHDL-models are a DoD requirement for vendors. Simulation systems and other tools such as synthesis, verification and others based on VHDL are available.

By using synthesis tools, the modeling, verification and implementation processes of programming an FPGA can be easily accomplished. The major advantage of synthesis-based designs is that the same hardware description language code can be used for verification and implementation. This integrated design flow reduces the amount of code that has to be maintained and the risk of inconsistencies between different models. Once the functional correctness of the FPGA program has been proved, the same code can be usable to generate a hardware implementation. Ideally, this process would require only recompilation of the VHDL program with a silicon compiler to program or reprogram an address mode into hardware, if desired.

Some FPGAs contain special circuitry to implement common arithmetic functions such as add, subtract, shift, etc. When such special circuitry is provided, a special software library is advantageously provided to help a programmer in using these special functions. In a preferred embodiment of the present invention, the programmable AAU 212 has special purpose hardware to efficiently implement fast carry logic as found in adders, subtractors, counters and other related function blocks, and is thus able to make use of such special libraries. Such software design tools are available, for example, from XILINX Inc.

One skilled in the art will recognize that combining the FPGA with a DSP allows the program developer to, in effect, create a customized DSP without resorting to custom hardware. The customized DSP can provide special functions to perform address calculations for a specific algorithm as programmed by the programmer. Instead of the simple cross-bar switch described above in connection with FIG. 3, implementing the programmable AAU 212 as a FPGA allows a programmer to implement very complex address calculation algorithms. To implement a desired algorithm (e.g. an FFT) that uses the FPGA 212, a developer will typically first program the FPGA 212. The FPGA 212 is programmed by writing an FPGA program in a language such as VHDL. Once the FPGA program is written, the developer writes a DSP program in an appropriate language (e.g. C or assembler) for the DSP. The program for the DSP will use DSP instructions that access functions programmed into the FPGA. To run the algorithm (e.g. the FFT) the developer will load the compiled VHDL program into the memory 217, load the DSP program into the program memory 107, and start the DSP program.

In yet another embodiment, the programmable AAU 212 is an FPGA which is programmed not by manually writing code, but rather by a compiler that reads the source code of a DSP program and generates code for the programmable AAU, thereby relieving the developer of the task of programming the FPGA. In yet another embodiment, the programmable AAU 212 is programmed by a software module which "watches" the sequence of addresses generated by a DSP program and then writes code for the programmable AAU 212 to generate that same sequence of addresses.

Figure 6A:
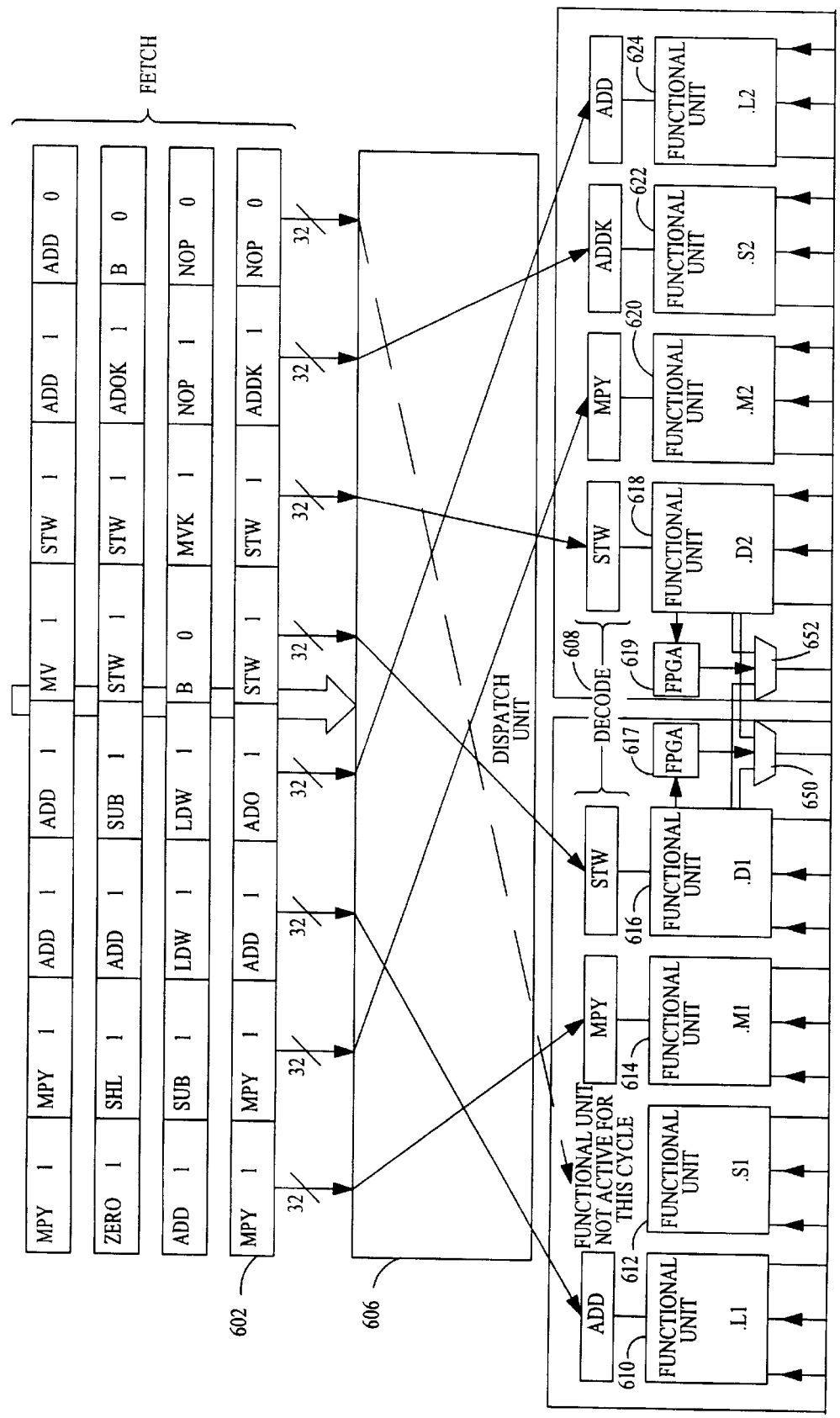
FIG. 6 is a block diagram that illustrates programmable address computation using a programmable address arithmetic unit in a very long instruction word architecture.

FIG. 6, comprising FIGS. 6A and 6B, is a block diagram of a Very Long Instruction Word (VLIW) DSP 600 with a first programmable AAU 617 and a second programmable AAU 619. In the VLIW DSP 600, an output of a fetch register 602 provides a VLIW to a dispatch unit 606. The dispatch unit 606 decodes the VLIW and dispatches instructions and data to functional units 610, 612, 614, 616, 618, 620, 62, and 624. The functional units 610, 612, 614 and 616 send data to, and receive data from, a first register file 632. The functional units 618, 620, 622 and 624 send data to, and receive data from, a second register file 634. The first and second register files 632 and 634 also send data to, and receive data from a data memory controller 660 which controls data accesses to a data memory 658. Addresses to the data memory 658 are provided by a first address multiplexer 650 and a second address multiplexer 652. A first input of the first address multiplexer 650 is provided by the functional unit 616 and a second input of the first address multiplexer 650 is provided by the functional unit 618. A first input of the second address multiplexer 652 is provided by the functional unit 616 and a second input of the second address multiplexer 652 is provided by the functional unit 618. An output of the first multiplexer 650 is provided to the data memory 658 by a first address bus 654. An output of the second multiplexer 652 is provided to the data memory 658 by a second address bus 656. The programmable AAUs 617 and 619 each comprise an internal memory. The programmable AAU 616 receives data from the functional unit 616 and provides data to a third input of the multiplexer 650. The programmable AAU 619 receives data from the functional unit 618 and provides data to a third input of the multiplexer 652

A VLIW DSP is a form of parallel processor wherein a Very Long Instruction Word (VLIW), comprising several instructions, is fetched and decoded into separate instructions. The instructions decoded from the VLIW are passed to multiple functional units which may operate in parallel. The DSP 600 fetches a VLIW from a program memory or cache into the fetch register 602. The fetch register provides the VLIW to the dispatch unit 606 which decodes the VLIW into instructions and data for each of the functional units. The functional units operate on immediate data from the VLIW and on data stored in the first register file 632 and the second register file 634. Data is loaded from the program memory 658 into the registers in the register files 632, 634 by a load instruction. Data is stored from the register files 632, 634 into the program memory 658 by store instructions. Addresses for the load and store instructions are computed by the functional units 616 and 618. Typically, addresses are stored in the register files 632, 634 and address calculations are performed by the functional units 616 and 618 and the programmable AAUs 617 and 619. As in the previous embodiments, the programmable AAUs 617 and 619 may be programmed by a programmer to provide new addressing modes.

Figure 7:
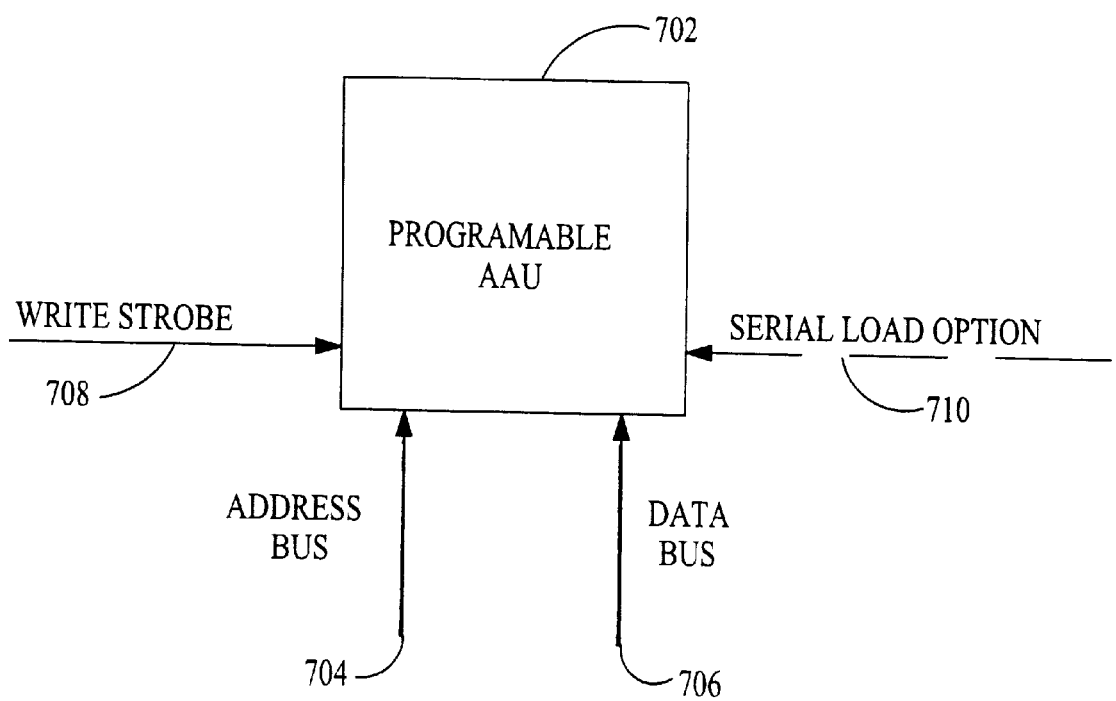
FIG. 7 is a block diagram that illustrates the data paths used to program a programmable address arithmetic unit having an internal memory.

FIG. 7 is a block diagram that illustrates one embodiment of the data paths used to program a programmable AAU 702 having an internal memory or program register set. Program data is provided to the programmable AAU 702 on a data bus 706. An address bus 704 provides an address to the programmable AAU 702. A write strobe 708 is also provided as an input to the programmable AAU 702. An optional serial input bus 710 is also provided to the programmable AAU 702.

Data is loaded into the programmable AAU 702 by placing the desired data onto the data bus 406 and placing an address on the address bus 704. The data is then clocked onto the programmable AAU memory by asserting the write strobe 708. Alternatively, data may programmed into the programmable AAU 702 using the serial line 710 and one of the many serial line protocols known in the art. The programmable AAU 702 may also be programmed under software control by a special DSP instruction. Alternatively, the data on the data bus 706 and the address on the address bus 704 may be provided under hardware control, either at boot time or during normal operation. Alternatively, the programmable AAU may be programmed by mapping the programmable AAU memory into the normal memory address space of the DSP, or by mapping the programmable AAU memory to an input/output port of the DSP.

Other Embodiments

Although the present invention has been described with reference to a specific embodiment, other embodiments occur to those skilled in the art. It is to be understood therefore, that the invention herein encompasses all such embodiments that do not depart from the spirit and scope of the invention as defined in the appended claims.

What is claimed is:

1. A processor comprising:
    a data memory for storing data;
    a set of instructions that are executed by said processor, said instructions including one or more user-defined addressing modes to reference data stored in said data memory;
    a programmable address arithmetic unit (programmable AAU) providing logic functions, said logic functions specified by data stored in an programmable AAU memory, whereby said logic functions implement said one or more user-defined addressing modes and said programmable AAU is for storing user-defined configuration data that specifies said logic functions;
    one or more registers, each register configured to hold an address into said data memory, said registers operatively coupled to said programmable AAU such that said programmable AAU can use one of said user-defined addressing modes to modify said address into said data memory held in each of said registers; and
    an instruction decoder responsive to said instructions and said one or more user-defined addressing modes, wherein output bits of said instruction decoder are coupled as inputs to said programmable AAU to control the modification of an address stored in said one or more registers.

2. The processor of claim 1, wherein said AAU memory is loaded with data as part of an initial boot-up of said processor from a boot memory.

3. The processor of claim 1, wherein said AAU memory is loaded by using a direct memory access channel from said data memory.

4. The processor of claim 1, wherein said programmable AAU comprises a micro-sequencer capable of performing multi-cycle operations.

5. The processor of claim 1, wherein said programmable AAU comprises a programmable logic array.

6. The processor of claim 1, wherein said programmable AAU comprises a field programmable gate array.

7. The processor of claim 1, wherein said programmable AAU comprises a cross-bar switch configured to receive an input word comprising a plurality of bits and to produce an output word by programmably re-arranging the bits in said input word.

8. A processor, comprising:
a program memory storing instructions;
a data memory storing data;
an arithmetic unit connected to said program memory and said data memory and performing arithmetic manipulations on said data in accordance with said instructions;
an address program memory storing configuration data, said configuration data for defining one or more user-defined addressing modes;
an address memory storing addresses which access said data in said data memory; and
an address arithmetic unit connected to said address program memory and said address memory and performing arithmetic manipulations on said addresses in accordance with said configuration data to generate new addresses in accordance with one or more of said user-defined addressing modes.

9. The processor of claim 8, wherein said address memory comprises one or more registers.

10. The processor of claim 8, wherein said address memory comprises one or more address registers.

11. The processor of claim 8, wherein said address arithmetic unit is responsive to said instructions.

12. The processor of claim 8, wherein data is stored in said address program memory by using said instructions.

13. The processor of claim 8, wherein said configuration data loaded into said address program memory modifies one or more of said user-defined addressing modes that are used to perform addressing in support of one or more of said instructions.

14. The processor of claim 8, wherein said address arithmetic unit memory is loaded by using a direct memory access channel from said data memory.

15. The processor of claim 8, wherein said address arithmetic unit comprises a micro-sequencer capable of performing multi-cycle operations.

16. The processor of claim 8, wherein said address arithmetic unit comprises a programmable logic array.

17. The processor of claim 8, wherein said address arithmetic unit comprises a field programmable gate array.

18. A method of operating a processor which includes a main ALU and memory, comprising:
providing a programmable address computational unit separate from said ALU, said programmable address computational unit being adapted to utilize one or more user-defined addressing modes; and
providing addresses into said memory to sequence data into said ALU from said programmable address computation unit, whereby said addresses are generated in accordance with one or more of said user-defined addressing modes.

19. The method of claim 18, wherein said programmable address computational unit is responsive to one or more auto-update instructions, and the action carried out in response to the one or more auto-update instructions is in accordance with one of said user-defined addressing modes.

20. The method of claim 18, further comprising providing a programmable address computational unit memory for storing loadable configuration data, said configuration data specifying said one or more user-defined addressing modes.

21. The method of claim 20, further comprising providing at least one instruction to cause said configuration data to be loaded into an address computational unit memory.

22. The method of claim 18, wherein said addresses are stored in registers.

23. The method of claim 18, wherein said programmable address computation unit is a programmable logic device which is programmed by loading data into an address computational unit memory.

24. A processor comprising:
a data memory, said data memory storing data;
a set of instructions that are executed by said processor, said instructions including addressing modes to reference data stored in said data memory;
an address arithmetic unit means for providing address calculations using configuration data specifying one or more user-defined addressing modes stored in an address arithmetic unit memory, said address arithmetic unit means capable of calculating one or more new addresses per clock cycle in accordance with one or more of said user-defined addressing modes.

25. The processor of claim 24, further comprising configuration means for loading data into said address arithmetic unit memory.

26. A processor comprising:
a programmable address arithmetic unit;
a loadable address program memory for storing configuration data defining operations carried out by said programmable address arithmetic unit;
whereby said programmable address arithmetic unit interprets instruction opcodes to implement a user-defined addressing mode, and said user-defined addressing mode is specified in accordance with said configuration data.

27. The processor of claim 26, whereby a mnemonic is used to specify an auto-update, and the action taken in response execution of the auto-update is defined by said configuration data.

28. The processor of claim 27, whereby said processor executes an instruction to determine which user-defined addressing mode to use in response to said mnemonic used to specify said auto-update.

29. The processor of claim 26, whereby said programmable address arithmetic unit comprises a programmable logic block used to implement said user-defined addressing mode, and said configuration data is used to specify logic operations carried out by said programmable logic block in response to processor instructions that specify said user-defined addressing mode.

30. The processor of claim 26, whereby said programmable address arithmetic unit comprises a programmable microsequencer used to implement said user-defined addressing mode, and said configuration data is used to specify combinatorial and/or sequential logic operations carried out by said programmable microsequencer in response to processor instructions that specify said user-defined addressing mode.

31. The processor of claim 26, whereby said a programmable address arithmetic unit is implemented within a functional unit among a plurality of functional units on a VLIW processor.

32. The processor of claim 26, whereby said a programmable address arithmetic unit is implemented within a functional unit among a plurality of functional units on a superscaler processor.

33. A processor comprising:

a data memory for storing data;

a set of instructions that are executed by said processor, said instructions including addressing modes to reference data stored in said data memory;

a programmable address arithmetic unit (programmable AAU) providing logic functions, said logic functions specified by data stored in an programmable AAU memory, said programmable AAU comprising a crossbar switch configured to receive an input word comprising a plurality of bits and to produce an output word by programmably re-arranging said plurality of bits in said input word;

one or more configuration instructions to load configuration data into said programmable AAU memory;

one or more registers, each register configured to hold an address into said data memory, said registers operatively coupled to said programmable AAU such that said programmable AAU can modify said address into said data memory held in each of said registers; and an instruction decoder responsive to said instructions and said addressing modes, wherein output bits of said instruction decoder are coupled as inputs to said programmable AAU to control the modification of an address stored in said one or more registers.

\* \* \* \* \*